United States Patent

Benson et al.

[15] 3,651,482

[45] Mar. 21, 1972

[54] INTERLOCKING DATA SUBPROCESSORS

[72] Inventors: Victor M. Benson, Belmont; Stuart K. Klein, Framingham, both of Mass.

[73] Assignee: Honeywell, Inc., Minneapolis, Minn.

[22] Filed: Apr. 3, 1968

[21] Appl. No.: 718,493

[52] U.S. Cl. ....... 340/172.5
[51] Int. Cl. ....... G06f 9/18
[58] Field of Search ....... 340/172.5; 235/157

[56] References Cited

UNITED STATES PATENTS

| | | | |
|---|---|---|---|
| 3,248,708 | 4/1966 | Haynes | 340/172.5 |
| 3,312,951 | 4/1967 | Hertz | 340/172.5 |
| 3,319,226 | 5/1967 | Mott et al. | 340/172.5 |
| 3,348,210 | 10/1967 | Ochsner | 340/172.5 |
| 3,462,741 | 8/1969 | Bush et al. | 340/172.5 |
| 3,480,917 | 11/1969 | Day | 340/172.5 |

*Primary Examiner*—Paul J. Henon
*Assistant Examiner*—Harvey E. Springborn
*Attorney*—Fred Jacob and Ronald T. Reiling

[57] ABSTRACT

Electronic data processing systems in which two or more microprogram controlled subprocessors are interlocked by interlock indicators placed in microinstructions. The microinstructions containing the interlock indicators are at critical sequence points in operations requiring two or more of said subprocessors to act concurrently and dependently. This permits interlock points in time to be unique and tailored to microprogram sequences requiring them. Operation is by blocking advance of a sequence of microinstructions for one subprocessor upon receiving an internal interlock indicator in the absence of an external interlock indicator from a microinstruction of another subprocessor operating interdependently therewith. The microprogram control and interlocks permit the subprocessors to proceed independent of the commencing instruction thus facilitating instruction look ahead.

11 Claims, 3 Drawing Figures

INTERLOCKING DATA SUBPROCESSORS

BACKGROUND OF THE INVENTION

As computers become more sophisticated and complex, their cost goes up and is desirably offset by greater throughput. The larger and more complex computers generally have larger capacity fast access main memories.

Since a memory size increase will never automatically result in a memory addressing and access speed increase but more commonly produces a speed decrease, it becomes important to utilize the main memory at its highest possible speed as continuously as possible. Attempts to fully utilize main memory for greater throughput have resulted in multiprocessor machines, multiprogramming and the use of "look ahead" features as well as considerable increase in the complexity of traffic control to peripheral equipment.

The term "multiprocessor" is used herein to define an electronic data processing system in which two or more processors, operating asynchronously in parallel interact to the extent of frequently working simultaneously on separate parts of the same problem.

The multiprocessor concept entails considerable expense in terms of additional and redundant hardware. Each processor uses independent address generators, internal memories and arithmetic and logic units. In complex systems, just the address generation alone can require considerable hardware. Further, hardware is usually required for look ahead features and interprocessor communications.

Look ahead is a general term describing the capability of examining program instructions in advance and, for example, commencing execution of the next instruction prior to completion of the present one if possible. This possibility occurs, for example, when the next instruction can be carried out up to some point by a separate processor and does not require the results of the present instruction. Interlocks define the point for each processor for each instruction.

"Look ahead" is usually complex and quite expensive in terms of hardware. Thus, it is often desirable to minimize "look ahead" logic, supply new instructions to processors as fast as the processors become available and utilize intercommunication between the processors. Intercommunication can require one processor to stall when it must wait for results of processing in another processor. Unfortunately, adequate intercommunication for this sort of operation is difficult to provide with any degree of flexibility or efficiency and usually results in unnecessary delays and/or unduly burdensome hardware implementation.

The present invention is a specific answer to the general problem of interconnecting mutually asynchronous devices. In electronic data processing the general problem occurs between a central processor and the peripheral input/output equipment; between individual input and output equipment; and between processors in a multiprocessor environment. It is undesirable in these situations to enforce synchronous operation because this limits the units involved to the speed of the slowest one without regard for specific need. With respect to peripheral equipment, complex input/output traffic controllers are used with or without some form of multiplexing. With multiple processors some form of software implementation to answer the specific problems facing the programmer is usually necessary. That is, the programmer in providing instructions to the different processors must include instructions telling them when to wait for each other. Some computers, especially designed for multiprocessor work, include hardware such as counters that the programmer can use to facilitate programming of the synchronization points between computers operating asynchronously in parallel.

In data processing the general problem also occurs when two or more subprocessors operate simultaneously on the same instructions. The software approach does not apply here since the problem occurs in the "micro world" in which the elemental operations are carried out by the machine in a maze of detail too great for effective handling by program instructions from the "macro world" of the programmer. Thus, the machine must have the built-in ability to interlock the subprocessors at critical processing points.

Particular goals in solving this problem are:

1. One subprocessor should be able to look ahead to the next instruction and commence work on that while another subprocessor is still operating on the previous instruction.

2. Interlock hardware should produce no substantial increase in cost or size.

3. Interlocks should be unique to subroutines that require them so as not to introduce unnecessary delays.

SUMMARY OF THE INVENTION

The present invention realizes improved efficiency by utilizing interlocks in the microinstructions of independent microprogrammed control elements of simultaneously operative subprocessors. A simple and flexible implementation is provided allowing simultaneous address generation and arithmetic processing as well as look ahead with no "guess." Other simultaneous subprocessing can be similarly implemented. Subprocessing in accordance with the invention is performed by a plurality of subprocessors each under the control of a separate microprogrammed control element. To permit full speed independent operation and still prevent one subprocessor from going beyond a point at which it has information for another subprocessor or at which another subprocessor requires processed information from it, interlock circuits are provided responsive to interlock indicators in the microinstructions of the individual control elements. Simple gating circuits provide all the necessary interlock implementation with minimal hardware.

Since the subprocessors are under independent microprogram control, one subprocessor, in the absence of an interlock indicator, can proceed to "look ahead" to the next instruction while the other subprocessor or subprocessors are still working on the previous instruction. This look ahead is blocked only by an interlock indicator unique to the microprogram sequence requiring it.

Thus, it is an object of the present invention to provide sequence interlocks in microprogrammable control elements of interacting data subprocessors.

It is a further object of the invention to provide a data processing system in which an address generating subprocessor and an arithmetic subprocessor are interlocked under microprogram control by gates interconnecting respective microprogrammable control elements.

It is still a further object of the invention to provide a system of gates interlocking two or more microprogrammable control elements.

A further object of the invention is to provide means allowing two interacting subprocessors to proceed at their own speed independently while safe-guarding necessary points of dependent interaction.

It is still a further object of the invention to provide means for interlocking the control elements of two or more subprocessors in a manner that is unique to the control sequences requiring such interlock.

Further objects and features of the invention will become apparent upon reading the following description together with the drawings.

DESCRIPTION OF THE PREFERRED EMBODIMENTS

The present invention finds application primarily in a central processor having two or more subprocessing units sharing a common main memory. The subprocessing units are each controlled by independent microprogrammable control elements.

Figure 1:
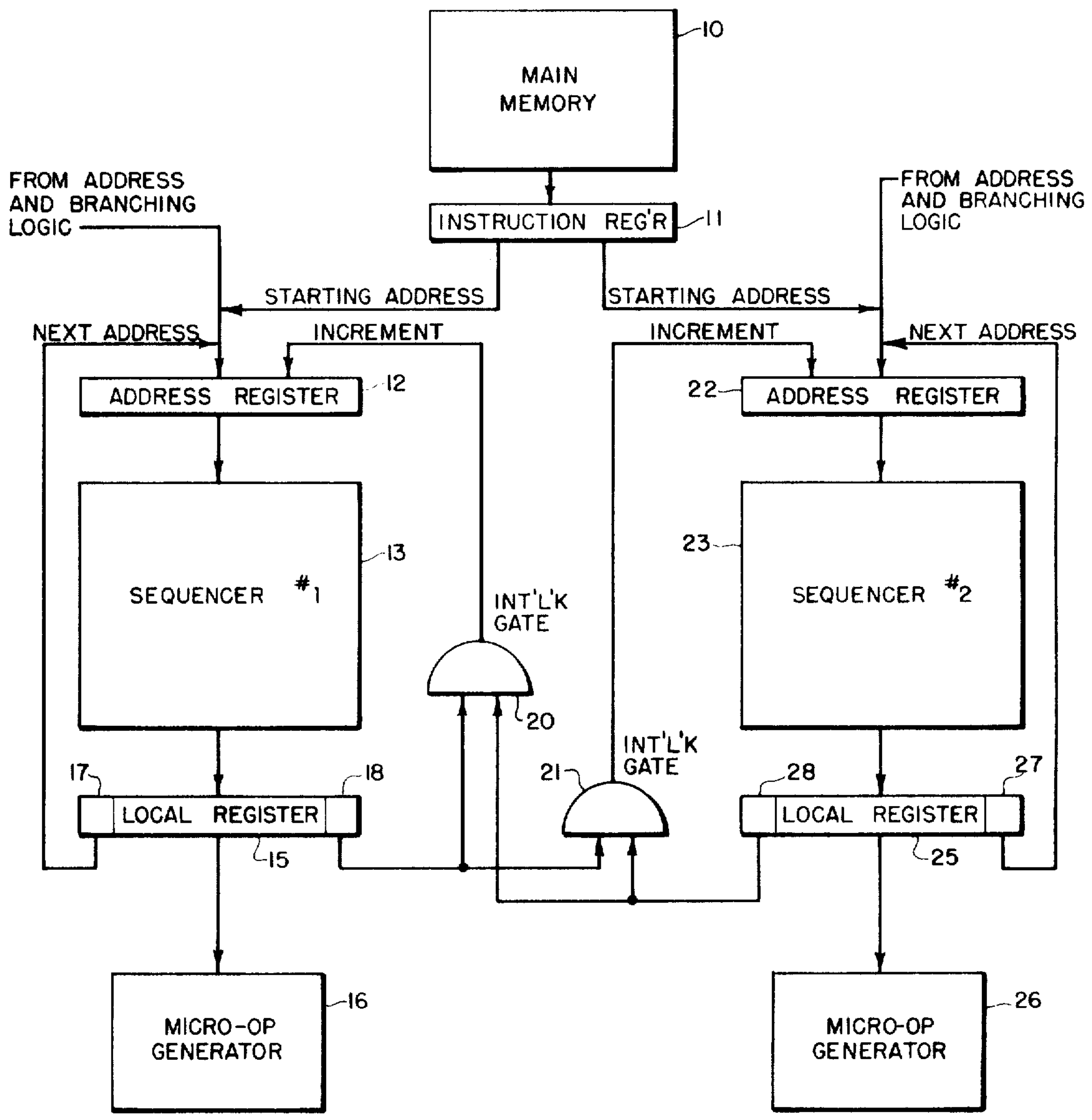
FIG. 1 is a partial block diagram of an electronic data processing system in which two microprogrammable control elements are interlocked in accordance with the invention.

FIG. 1 is a highly simplified block diagram depicting microprogrammable control elements for two subprocessing units along with interlock connections between the two control elements. The control elements are depicted as microoperation generators driven by addressable sequencers. The sequencers are suitably some form of fast access storage array. An example of one suitable sequencer is given in U.S. Pat. No. 3,157,862 assigned to the assignee of the present invention. A preferred sequencer is a Read-Only-Memory in which the microinstructions can be rewritten electrically but are not changed during normal operation. A typical micro-op generator may be a decoder of which the prior art is replete. (See page 306 of "Digital Computer Fundamentals" by Thomas C. Bartee.) Main memory 10 provides instructions to the control elements of the subprocessing units through an instruction register 11. Separate fields in this instruction register designate the starting microinstructions for the respective control elements of the processing units. Thus, one field of instruction register 11 is connected to the input of address register 12. Address register 12 selects the microinstruction in sequencer 13 to be registered in local register 15. The microinstruction in local register 15 specifies the microoperations to be performed by microoperation generator 16. Also, as depicted, one field 17 of local register 15 provides the next address to address register 12. A further field 18 is used for an interlock indicator which is supplied to interlock gates 20 and 21.

A field of instruction register 11 also provides a starting address to address register 22 of sequencer 23. The microinstruction addressed in sequencer 23 is provided to local register 25 and controls the microoperations of microoperation generator 26. Field 27 of local register 25 provides the next address to address register 22 and another field of local register 25 provides an interlock indicator for interlock gates 20 and 21.

Interlock gates 20 and 21 are depicted as AND gates which are enabled only by the simultaneous receipt of interlock signals from both registers 15 and 25. The output of interlock gate 20 is connected as an incrementing input to address register 12 and the output of interlock gate 21 is connected as an incrementing input to address register 22. Microoperation generators 16 and 26 provide the microoperations for the respective subprocessing units (not shown). A more detailed description of the interconnections with a system are illustrated and described with relation to FIG. 2.

In the operation of the embodiment depicted in FIG. 1, main memory 10 first provides an instruction which gives starting addresses for sequencers 13 and 23. Each microinstruction addressed in the respective sequencers provides, in local registers 15 and 25, subcommands to the microoperation generators 16 and 26 and also a next address from fields 17 and 27 respectively back to address registers 12 and 22. The two control elements cycle at full speed independently until an addressed microinstruction in one of the control elements contains an interlock indicator. For example, if a microinstruction appears in local register 15 having an interlock indicator in field 18, the address in field 17 will be a repeat address of the same word. This effectively stops the advance of the control element since it keeps repeating the same microinstruction with each cycle.

When sequencer 23 reaches the point in the instruction that sequencer 13 is waiting for, an interlock signal derived from field 28 of register 25 will be applied to an input of gates 20 and 21 along with the interlock signal derived from field 18 of local register 15. The next address provided by registers 15 and 25 respectively to address registers 12 and 22 will be repeat addresses. However, the outputs of gates 20 and 21 will modify the address registers 12 and 22 respectively so that a further sequential microinstruction will be accessed in each sequencer.

It will be recognized that data processors operate under a number of constraints. For example, one common restraint is availability of access to main memory. Most of the restraints are easily handled by fixed hardware. When two or more processors have some interdependent action, it has been common to put a fixed constraint on them restricting them to respective speeds permitting the various subcommand sequences requiring interdependent action to be performed without one of the processors getting ahead of the other with respect to such interdependence. However, delay constraints are different for different subcommand sequences and many subcommand sequences will frequently exist that require no interdependence at all. With the use of a small amount of gating and at least one bit or bit combination allocation in each microinstruction, the embodiment described in relation to FIG. 1 provides a means for confining the delay constraints of interdependent action uniquely to the subcommand sequences requiring them.

Figure 2:
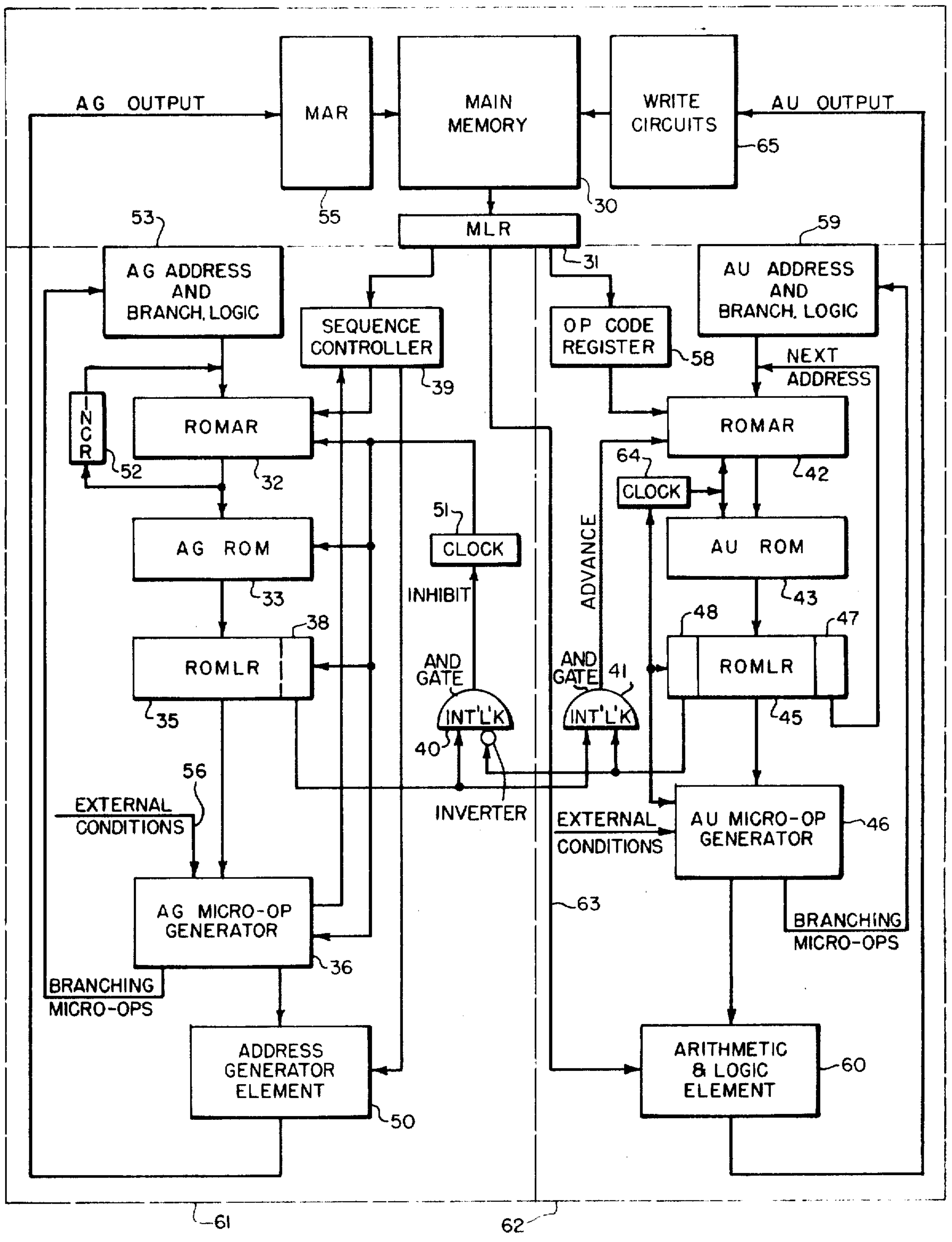
FIG. 2 is a simplified block diagram of the central processor of an electronic data processing system in which an address generating subprocessor and an arithmetic unit subprocessor are each controlled by control elements which have the interlock features of the present invention.

FIG. 2 depicts a more detailed embodiment in which two dissimilar subprocessors are operated with a common main memory. In this embodiment, one of the subprocessors is an address generator and the other subprocessor is an arithmetic unit. It is to be recognized that address generation for the main memory or control (scratch pad) memory of a central processor takes many forms, some of which are quite complex. For example, there is direct addressing, indirect addressing, direct indexed addressing and indirect index addressing both extended and normal in all cases as well as voids. In large computers sometimes all of these types of addressing, plus other types of addressing, are used and in these, the generation of addresses is more efficiently performed by a separate subprocessor operating asynchronously with respect to other processing having its own control element, storage registers and arithmetic and logic circuits.

The address generator subprocessor of FIG. 2 has a control element comprising ROM (Read Only Memory) address register 32, (Address Generator) ROM 33 and ROMLR (ROM Local Register) 35. The output of ROMLR 35 drives AG microoperation generator 36 which, in turn, supplies the control signals to address generator 50. The address generator receives instructions from main memory 30 through memory local register 31 and sequence controller 39. Sequence controller 39 provides a starting address for ROM address register 32. In the embodiment illustrated, AGROM 33, once started, cycles under control of clock 51 with the ROM address register 32 being incremented each cycle by incrementer 52. Branching to a different read only memory sequence is instituted by a branching microoperation through address generator address and branch logic 53. Address generator 50 is connected to memory address register 55 of main memory 30 to provide main memory addresses. An external conditions input 56 is provided to address generator microoperation generator 36 so that, for example, the results of an operation in the arithmetic and logic unit can effect the address generator microoperations. In some instances, a decision whether to branch or not to branch will depend upon the results of an arithmetical step in the arithmetic and logic unit. The arithmetic and logic unit is also controlled by an ROM control element comprised of ROM address register 42 connected to arithmetic unit ROM 43 which, in turn, is connected to ROM local register 45. ROM local register 45, in turn, is connected to supply control signals to arithmetic unit microoperation generator 46. An operation code register 58 connected to the output of main memory local register 31 provides the starting address to ROM address register 42. As in the embodiment of FIG. 1, the sequential addresses for the arithmetic unit ROM are supplied from the ROM words via field 47 of ROM local register 45. Thus, ROM local register field 47 is connected back to the input of ROM address register 42. For branching purposes, arithmetic unit microoperation generator 46 has an output connected to arithmetic unit address and branching logic 59 which provides branch addresses to ROM address register 42. Arithmetic unit microoperation generator 46 is connected to provide control signals to arithmetic and logic element 60. Arithmetic and logic element 60 has a direct input 63 from main memory local register 31 for receiving operands. An output connection of arithmetic and logic element 60 is provided to write circuits 65 of main memory 30 and provides results of arithmetic and logic operations to be stored in main memory. The interlock operation of (Address Generator) AG sub-processor 61 of the embodiment illustrated in FIG. 2 is generally as follows. Interlock characters in fields 38 and 48 of ROM local registers 35 and 45 respectively are suitably single-bit characters in which a "one" serves to indicate the presence of an interlock and a "zero" indicates no interlock. A "one" in field 38 and a "zero" in field 48 provide an output from interlock gate 40 stopping clock 51. This stops the address generator from proceeding until an interlock bit appears in field 48 of register 45. A "one" in field 48 blocks interlock gate 40 permitting clock 51 to recommence. With a zero in both fields 38 and 48, no inhibit action will take place and clock 51 will continue running. In the interlock operation of the (Arithmetic Unit) AU sub-processor 62 of the embodiment, a microinstruction word of the arithmetic unit ROM having an interlock character "one" in interlock field 48 has a repeat address in field 47. With a "one" in field 48 and a "-zero" in field 38, interlock gate 41 is blocked and the repeat address from field 47 causes read only memory address register 42 to repeat the address of the same word. With a "one" in field 48 and a "one" in field 38, an output from interlock gate 41 modifies the next address provided by field 47 of ROMAR 45 in ROM address register 42 so that the ROM control element of the arithmetic and logic processor advances. Following is a general functional and operational description of the embodiment of FIG. 2.

Although two different techniques of interlocking subprocessors have been shown on FIG. 2 and described in the Specification i.e., one technique for AG sub-processor 61 and another for AU sub-processor 62, it will be apparent, by referring to FIG. 1, which shows only one technique applied to both sub-processors, that either one of these techniques may be used for interlocking both sub-processors. Hence, the interlock technique described for AG sub-processor 61, may be substituted for the AU sub-processor 62 technique to be utilized in conjunction with the AG sub-processor 61 technique, and this is merely a matter of preference with the designer. Similarly, the interlock technique for AU sub-processor 62, may be substituted for AG sub-processor 61 technique.

The central processor not shown includes two "subprocessors": the "AU" (Arithmetic Unit) 62 and the "AG" (Address Generator) 61, each with its own ROM (Read Only Memory) 43 and 33. The AU 62 and AG61 function in parallel as two independent processors, each completely controlled by its own ROM. There is, however, a certain amount of synchronization and communication linking them. There are basic differences in organization, addressing, and decoding among the AU and AG ROM's. These differences reflect (and to some extent, produce) basic differences among the AU and AG themselves and serve to demonstrate the flexibility and amenability to specialization of an ROM. The high speed, complexity, and sheer physical size are important determinants in the way ROM control functions are implemented.

Address Generator ROM 33 controls the following: (1) Generation of all memory (main and control) addresses, (2) Cycling of control memory, (3) Generation of interprocessor communication data words (in conjunction with the AU ROM).

The AG ROM sequences constitute a set of basic microroutines from which a subset can be selected to generate any address or read or modify the contents of any control memory location. The following sample of typical AG ROM sequences will clarify this point: (1) Peripheral Counter Fetch, (2) Direct Main Memory Address, (3) Indexed Main Memory Branch, (4) Load AU Counter, Type 1, (5) Assemble Buffer Bits. Sample Sequence 1 represents sequences reading or writing into some special location; Sample 2 represents sequences pertaining to specific addressing types; Sample 3 represents sequences pertaining to a specific combination of order type (Branch) and addressing type (Indexed Main Memory); Sample 4 is typical of sequences relating to a specific combination of order type (Type 1) and Control Memory Location (AU Counter); Sample 5 is typical of sequences relating to specific orders (Assemble Buffer Bits).

When an instruction word arrives, conventional logic (Sequence Controller 39), of the type similar to that described and shown in FIG. 5 of U.S. Pat. of J. J. Eachus, No. 3,157,862 dated Nov. 17, 1964, will derive, from the instruction word itself, the set of AG ROM sequences necessary to generate all of the memory addresses and read/modify all of the control memory locations necessary for completion of the instruction. Sequence Controller 39 will then load the address of the first location of the first sequence into AG ROM Address Register 32. ROM Address Register 32 is then incremented by one at each clock time (unless there is a branch) until the last location of the sequence is reached, at which time Sequence Controller 39 loads the address of the first location of the next sequence into ROM Address Register 32. When the last location of the last sequence is reached, Sequence Controller 39 will load the address of the first location of the first sequence of the next instruction into ROM address register 32, and the procedure is repeated.

As implied above, AG ROM 33 may have facilities for branching from any location to any other location, conditionally or unconditionally, under its own control. Branching is used to conserve locations and expedite mapping by looping within a sequence, or by jumping to some part of another sequence or to some other part of ROM. Normally, once in a sequence, ROM Address Register 32 will increment by one at each clock pulse down through the sequence to the last location, unless a branch is encountered. After the branch, normal incrementation of ROM Address Register 32 will resume.

AG ROM 33 contains, by way of example, 54 sequences of anywhere from two (Direct Main Memory Address) to 102 (Peripheral Instruction) words each; eight words per sequence is "typical." The generation of each memory address requires the use of anywhere from one (Direct Main Memory) to four (Peripheral Counter Delivery) of these sequences; two sequences per address is "typical." For each address to be generated, the particular sequences used, and the order in which they are used, is a complex function of the instruction, addressing type, and Control Memory Locations involved. Thus, generating the A-address for a Binary Add order might involve either of two very different series of sequences because of differences in the addressing types. Of course, a given sequence might be used in many different orders.

Arithmetic Unit ROM 43 controls the ROM (1) Manipulation of operands, (2) Cycling of the AU scratch pad memory (not shown), (3) Generation of interprocessor communication data words (in conjunction with AG/61).

In order to make most economical use of ROM 43, machine orders are arranged by way of example into some 50 groups of closely related orders; there is a distinct AU ROM sequence for each group. For example, the Fixed Add sequence comprises the Decimal Add, Binary Add, Decimal Subtract, Binary Subtract, Extended Binary Add and Extended Binary Subtract instructions. Particular variations are by branching.

When an instruction word arrives, the Op Code (Operation Code) bits are stored in Op Code Register 58. When the instruction presently being processed is completed, (and, if no errors have been detected) the Op Code Register content is transferred to AU ROM Address Register 42. The from location thus addressed is called an Op Code Location; there is one Op Code Location for each of the machine Op Codes.

Several of the bits of each AU ROM word are reserved as Next Address Field 47. Normally (except when entering a sequence, or when branching within a sequence) Next Address Field 47 is the source for the next value of ROM Address Register 42. The Next Address Field of an Op Code Location is the address of the first word of the sequence to be used in executing the order. For example, the Next Address Field of the Binary Subtract Op Code Location is the address of the first location of the Fixed Add Sequence. This method of addressing, wherein each ROM word specifies the next ROM word, affords complete flexibility in mapping.

Branching is employed to: (1) Specialize a sequence to the particular order within the order group, (2) Account for variations in addressing forms, (3) Account for operand-dependent conditions. For example, it is branching which specializes the Fixed Add Sequence for the particular case of: Decimal Subtract, void A-address, Accumulator and B-operands of like signs, magnitude of B-operand greater than magnitude of Accumulator.

Branching is controlled by Branching microoperations arranged into mutually exclusive groups. Each branching microoperation refers to a particular subset of Branching Conditions and to a particular one of the bits of AU ROM Address Register 42. A branching microoperation "says" that if the specified conditions are true, the specified Address Register bit should be set to ONE. As the Next Address Field is loaded into the Address Register, the active branching microoperations have the effect of superimposing selected external conditions on selected bits of the Address Register.

Figure 3:
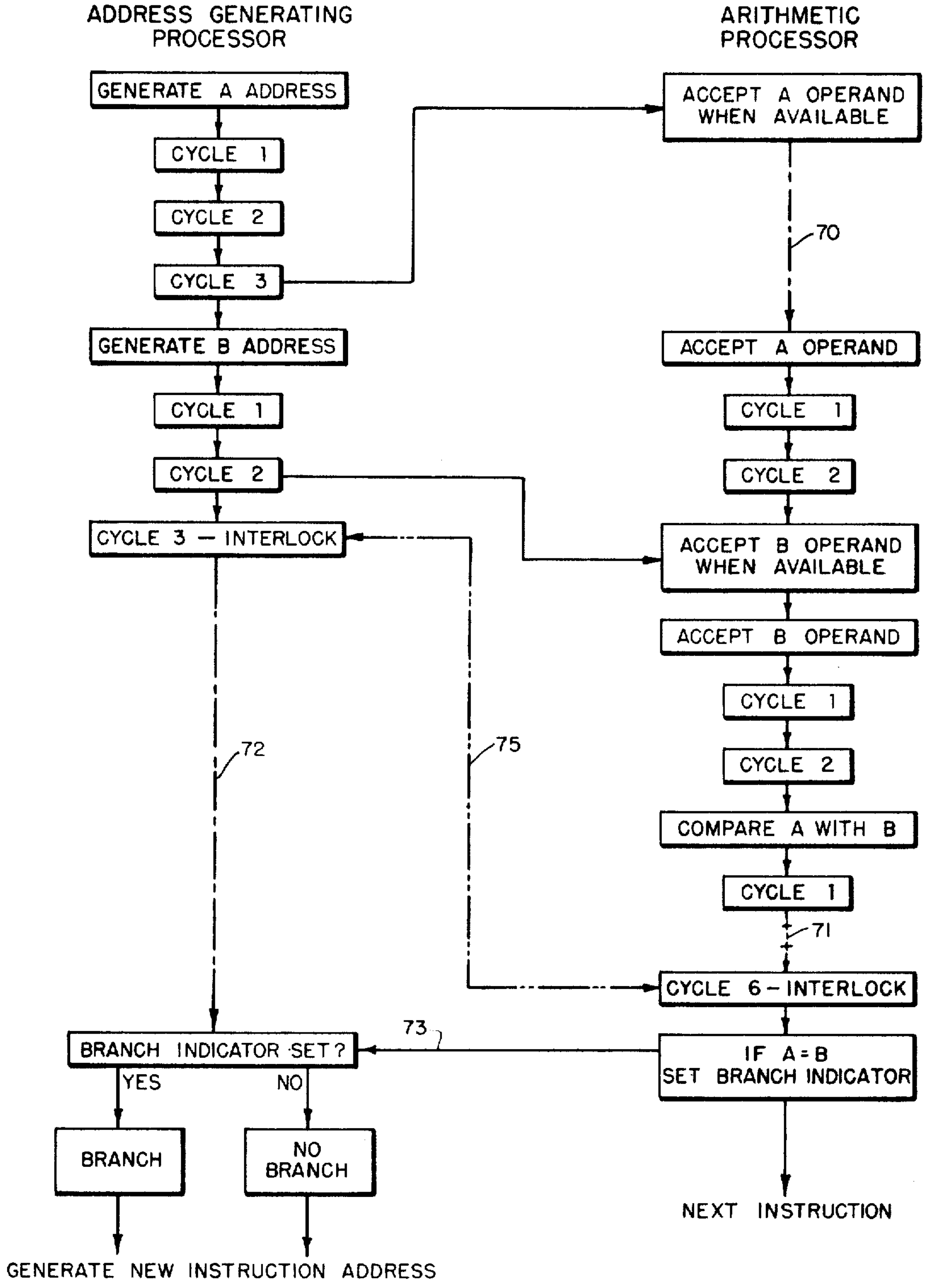
FIG. 3 is a flow chart showing the sequencing of the control elements of FIG. 2 performing a compare instruction that requires the interlock feature of the present invention.

In order to explain the significance of the present invention, an example of one of the more simple procedures using the interlock concept disclosed herein, is given in flow chart format in FIG. 3.

The example given is a simple A and B operand compare. The instruction from Main Memory 30 instructs Address Generator 61 to generate the A Operand Address. The instruction from Main Memory 30 also instructs the arithmetic unit to accept the A operand. Conventional hard wired logic prevents the arithmetic unit from advancing until the A operand is available. In the embodiment described most delays required by lack of available access to main memory are hard wired. Since this is conventional and not part of the invention, it is not described in detail.

The address generator goes ahead through the necessary ROM cycles to generate the A Operand Address. This is depicted in FIG. 3 as three cycles. During this time the arithmetic unit ROM may be stalled as indicated by dash dot line 70.

When the A operand address is generated, it is provided to Memory Address Register 55 making the A operand available. The availability of the A operand resumes the advance of ROM 43 of arithmetic unit 62. FIG. 3 depicts ROM 43 going through two cycles in accepting operand A. It should be understood that the number of cycles illustrated for each operation are only for descriptive purposes and in typical cases a relatively larger number of cycles, for example, eight, will be needed.

The Address Generator 61 proceeds immediately upon completion of the A Operand Address to generate the B Operand Address. Since a single instruction word can cover generation of both A and B Operand Addresses, the delays encountered by the Address Generator up to this point will be its own internal processing time plus delays due to non-availability of main memory. After completing the generation of B Operand Address, the Address Generator must wait for the results of the comparison from the arithmetic unit to obtain its next instruction address. For example, in the absence of a true comparison, the same AG ROM would extract the address of the next sequential instruction.

The signal to the Address Generator to wait is in the form of an interlock indicator in the last word of the "Generate B Address" sequence. This is indicated in FIG. 3 by a block designated "Cycle 3-Interlock."

Referring to FIG. 2, it will be noted that an AG Interlock character inhibits clock 51 thus halting advance of AG ROM 33.

The arithmetic unit continues first accepting the B operand and then comparing the A and B Operands. The comparison requires a sequence of AU ROM cycles 1 through 6, this number of cycles being arbitrarily selected as a compare sequence for purposes of description. Dash-cross line 71 denotes cycles not illustrated. The last word of the comparison sequence provides an interlock indicator depicted by a block designated "Cycle 6-Interlock." The AU Interlock character enables clock 51 (see FIG. 2) by blocking interlock gate 40. This serves the purpose of informing the Address Generator that the comparison results are available by restarting advance of the AG ROM. Dashed line 72 in FIG. 3 indicates the delay period while the Address Generator has waited for the results of the A/B comparison.

In response to the presence of the AU Interlock character, the Address Generator advances and the A & B comparison results are considered as external conditions applied to AG Microoperation Generator 36 as input 56 (FIG. 2).

Referring again to FIG. 3, the block designated "If A = B Set Branch Indicator" sets the branch indicator of the Ag depending on the results from the arithmetic unit. Line 73 represents this communication. A true compare can, by way of example, cause a branching microoperation designated by the block entitled "Branch." A noncompare can, by way of example, result in a continuation of the same sequence "No Branch." The two sequences will result in generation of addresses for different instructions depending on the comparison results.

The presence of the AG Interlock, depicted by dashed line 75, on occurrence of the AU Interlock, permits the Arithmetic Unit to continue. If the AG Interlock were not present, the Arithmetic Unit would continue to cycle on the last word.

Advance of the Arithmetic Unit may be halted even though the AG Interlock has been present due to lack of a next instruction.

The flow chart of FIG. 3 describes a subcommand sequence requiring an interlock between the two subprocessors of FIG. 2. considering these same two subprocessors, some subcommand sequences will not require an interlock. For example, in the instruction: "Add A and B then place the sum in Memory Register X," none of the addresses to be generated are dependent on the results of the arithmetic. Thus, the Address Generator can go ahead and generate addresses including next instruction and addresses required by the next instruction at top speed limited only by access to the Main Memory. The Arithmetic Unit also operates at full speed except for Memory availability. Thus, this sequence is not hampered by unnecessary delays. The Read Only Memory interlocks are provided uniquely to sequences requiring them. Additional logic is used to prevent operands from arriving sooner than the AU can accept them or results delivered sooner than the AU can provide them.

The instruction look ahead features of the embodiments described are not immediately obvious from the drawings. A more detailed description of this feature is found in U.S. Pat. of Lukoff et al., No. 3,254,329, Referring to FIG. 2, Address Generator Element 50 preferably includes a plurality of registers for queuing main memory addresses in advance of use. This allows the Address Generator 61 to continue generating addresses even though Arithmetic Unit 62 is not ready to use them. Since both Arithmetic Unit 62 and Address Generator 61 continue operation under microprogram control independently of the commencing instruction, address Generator 61 can extract an instruction and start generating addresses from it while Arithmetic Unit 62 is still processing the previous instruction. This look ahead type of operation is greatly simplified in the present invention since the interlocks operated through indicator bits in the microinstructions provide the necessary protection as to critical points at which subprocessor operation must mesh. As is apparent from the foregoing disclosure, the complexity and cost of hardware required for this interlock protection is negligible.

While the invention has been described with respect to specific embodiments having only two subprocessors, it is also applicable in instances where three or more subprocessors require process interlocks. The particular gating structures used depend to some extent on the configurations of the sequencers. Thus, FIG. 1 shows an essentially symmetrical arrangement while FIG. 2 shows one subprocessor being halted by an interlock while the other processor continues cycling on a single word in response to an interlock.

In the embodiment of FIG. 2, it is also sometimes desirable to operate the two subprocessors in a master-slave condition. By removing or disabling interlock gate 40, only Arithmetic Unit 62 is halted by an interlock character. An interlock character from address generator 61 then reenables Arithmetic Unit 62 as a master. Other variations adapted to particular subprocessor configurations are contemplated as within the inventive concept and it is intended to cover the invention broadly within the spirit and scope of the appended claims.

What is claimed is:

1. In combination with an electronic data processing system comprising a main memory, and address generator unit, and an arithmetic and logic unit, the improvement comprising:

a. a first addressable microprogrammed control element coupled to said address generator unit, said first addressable microprogrammed control element providing microinstruction words for directly controlling the operations of said address generator unit;

b. A second adressable microprogrammed control element coupled to said arithmetic and logic unit, said second addressable microprogrammed control element providing microinstruction words for directly controlling the operations of said arithmetic and logic unit;

c. advancing means coupled to said first and second microprogrammed control elements, said advancing means sequentially incrementing the address of the microinstruction words in said first and said second addressable microprogrammed control elements respectively;

d. enabling means coupled to said advancing means, said enabling means responsive to an interlock character in a microinstruction word of said one of said addressable microprogrammed control elements, said enabling means also responsive to another interlock character in another microinstruction word in the other addressable microprogrammed control element, said enabling means enabling the advance of the addresses of the microinstruction words of said one and said other microprogrammed control elements when said one and said other microprogrammed control elements have concurrently provided microinstruction words to predetermined locations in said one and said other microprogrammed control elements.

2. The combination according to claim 1, in which said addressable microprogrammed control elements comprise read only memories, the contents of which are fixed during the normal operation of the data processing system, and micro-op generators.

3. The combination according to claim 1, including next address means in said second addressable microprogrammed control means for providing the next address of a microinstruction word when an interlock character is not present in a predetermined location in said second addressable microprogrammed control element, and wherein said enabling means are interlock gates responsive to an interlock character in a microinstruction word of one of said first or second addressable microprogrammed control elements, said interlock gates preventing the advance of the address of the microinstruction word of said one of said microprogrammed control elements when said one of said microprogrammed control elements have provided a microinstruction word containing an interlock character to a predetermined location in said one of said microprogrammed control elements.

4. The combination according to claim 3 wherein said enabling means comprises means to modify said repeat address.

5. The method of selectively interlocking the operation of two simultaneously operable subprocessors comprising: controlling each of said subprocessors with microinstructions stored in a microprogrammed sequencer; entering interlock characters in microinstruction words unique to points in microprogram sequences requiring one of said subprocessors to depend upon the other; and stalling the operation of one of said sequencer upon reaching a microinstruction containing an interlock character in advance of the other said sequencer reaching a microinstruction containing a respective interlock character.

6. In an electronic data processing system a central processor comprising:

a. a main memory;

b. a first subprocessor coupled to said main memory;

c. a second subprocessor coupled to said main memory;

d. a first microprogrammed control element storing and providing microinstructions, said control element being coupled to said main memory, said control element controlling said first subprocessor, said first microprogrammed control element including;

1. first advancing means for incrementing the address of the microinstruction in said first microprogrammed control element; and 2. first storing means for temporarily storing an interlock indicator from a predetermined field of one of the microinstructions stored in said first control element, said field being representative of an interlock function;

e. a second microprogrammed control element storing and providing microinstructions, said second control element being coupled to said main memory, said second control element controlling said second subprocessor, said second microprogrammed control element including;

1. second advancing means for incrementing the address of the microinstructions in said second microprogrammed control element; and 2. second storing means for temporarily storing an interlock indicator from a predetermined field of one of the microinstructions stored in said second control element, said field being representative of an interlock function;

f. first enabling means responsive to predetermined concurrent patterns of the interlock indicators temporarily stored in said first and second storing means for enabling the address incrementation by said first control element, said first enabling means including means also responsive to other predetermined concurrent patterns of the interlock indicators temporarily stored in said first and second storing means for disabling the address incrementation by said first control element;

g. and second enabling means responsive to second other predetermined concurrent patterns of the interlock indicators temporarily stored in said first and said second storing means for enabling the address incrementation by said second control element, said second enabling means including means also responsive to third other predetermined concurrent patterns of the interlock indicators temporarily stored in said first and second storing means for disabling the address incrementation by said second control element.

7. The combination according to claim 6 wherein said first subprocessor is an address generator and said second subprocessor is an arithmetic unit.

8. The combination according to claim 6 wherein said microprogrammed control elements of said first and said second subprocessors cooperate one with the other respectively wherein said interlock indicator in a microinstruction of the control element of said second subprocessor stalls the address incrementation by said second subprocessor, and said interlock indicator appearing in a microinstruction in the control element of said first subprocessor concurrently with said interlock indicator in a microinstruction of the control element of said second subprocessor enables the address incrementation by said second subprocessor.

9. The combination as recited in claim 6 wherein said first and second microprogrammed control elements are read only memories (ROM's).

10. The combination as recited in claim 6 wherein a first predetermined concurrent pattern of interlock indicators temporarily stored in said first and second storing means comprises an interlock indicator stored in said first storing means but no interlock indicator stored in said second storing means, said first predetermined pattern for stalling the address incrementation of said first microprogrammed control element but enabling the address incrementation of said second microprogrammed control element, wherein a second predetermined concurrent pattern of interlock indicators temporarily stored in said first and second storing means comprising an interlock indicator stored in said second storing means but no interlock indicator stored in said first storing means, said second predetermined pattern of interlock indicators for stalling the said second microprogrammed control element but enabling the said first microprogrammed control element, and wherein a third predetermined concurrent pattern of interlock indicators temporarily stored in said first and second storing means comprise an interlock indicator stored in said first storing means and also an interlock indicator stored in said second storing means, said third predetermined concurrent pattern of interlock indicators for enabling the said first and second microprogrammed control elements.

11. The combination as recited in claim 6 wherein said first enabling means is an AND gate having one of its inputs preceded by an INVERTER, and wherein said second enabling means is an AND gate.

* * * * *